United States Patent
Bora et al.

(10) Patent No.: US 11,467,757 B1
(45) Date of Patent: Oct. 11, 2022

(54) MODIFYING DATA OF ACTIVATED TARGET-LESS POINT-IN-TIME IMAGES OF STORAGE VOLUMES

(71) Applicant: EMC IP HOLDING COMPANY LLC, Hopkinton, MA (US)

(72) Inventors: Bhaskar Bora, Shrewsbury, MA (US); Jeffrey Wilson, Franklin, MA (US); Michael Ferrari, Douglas, MA (US); William Stronge, Westford, MA (US); Sandeep Chandrashekhara, Shrewsbury, MA (US)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 17/306,424

(22) Filed: May 3, 2021

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01); *G06F 3/0644* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 9,009,437 B1 * | 4/2015 | Bjornsson | G06F 3/0641 718/1 |
| 2002/0093691 A1 * | 7/2002 | Durrant | G06F 16/219 358/404 |
| 2015/0186044 A1 * | 7/2015 | Sharma | G06F 3/0604 711/162 |
| 2016/0042090 A1 * | 2/2016 | Mitkar | G06F 11/1458 707/649 |
| 2016/0357640 A1 * | 12/2016 | Bushman | G06F 11/1451 |
| 2019/0026187 A1 * | 1/2019 | Gulam | G06F 16/128 |
| 2019/0042373 A1 * | 2/2019 | Mark | G06F 3/061 |
| 2021/0011816 A1 * | 1/2021 | Mitkar | G06F 11/3409 |

\* cited by examiner

*Primary Examiner* — William E. Baughman
(74) *Attorney, Agent, or Firm* — Anderson Gorecki LLP

(57) ABSTRACT

A target-less point in time image (snapshot) of a storage volume is allowed to be built after activation, by enabling the snapshot data to be modified to create a crash-consistent replica of the source data after the snapshot has been activated. The data of the snapshot remains immutable from a user standpoint, but the snapshot is able to be quickly activated before all of the data of the snapshot has been included in the snapshot, to thus reduce an amount of time IO operations on the source volume are quiesced. A first snapshot of a storage volume is created on a primary storage system and a corresponding second snapshot of the storage volume is activated on a backup storage system before all the data of the first snapshot is received at the backup storage system. Entries of the activated second snapshot are then changed to point to correct back-end allocations.

20 Claims, 5 Drawing Sheets

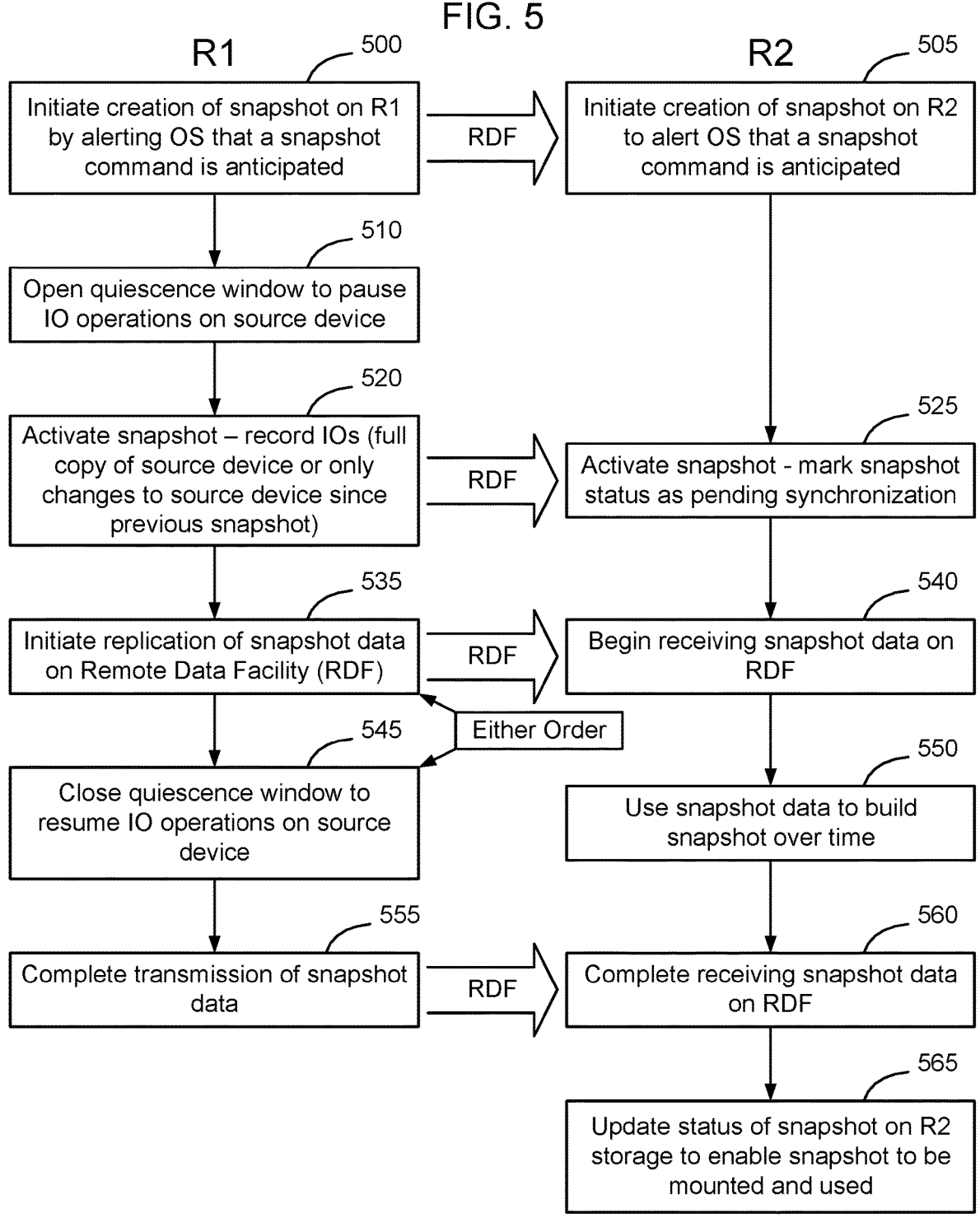

US 11,467,757 B1

MODIFYING DATA OF ACTIVATED TARGET-LESS POINT-IN-TIME IMAGES OF STORAGE VOLUMES

FIELD

This disclosure relates to computing systems and related devices and methods, and, more particularly, to modifying data of activated target-less point-in-time images of storage volumes.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Target-less point in time images (snapshots) of a storage volume are allowed to be built after activation, by enabling the snapshot data to be modified to create a crash-consistent replica after the snapshot has been activated. The data of the snapshot remains immutable from a user standpoint, but the snapshot is able to be quickly activated before all of the data of the snapshot has been included in the snapshot.

Modifying snapshot data after activation to create a crash-consistent replica of a source volume is useful in situations where it is difficult to include all required data in the snapshot before the snapshot is activated. For example, target-less point in time images (snapshots) of a storage volume on a storage system can be locally created and mirrored to a backup storage system on a data reproduction facility. On the backup storage system, the snapshot is activated before all of the data associated with the snapshot is received on the data reproduction facility. As data is received, the status of the snapshot is identified as synchronization pending, to prevent the activated snapshot from being used on the backup storage system. After the data has been received at the backup snapshot, the status of the snapshot is changed to ready, to enable the snapshot to be used on the backup storage system. By enabling data to be written to the activated snapshot, it is possible to reduce the amount of time the source is required to be quiesced, thus reducing the impact of the background RDF process on host IO operations.

BRIEF DESCRIPTION OF THE DRAWINGS

FIG. 5 is a flow chart of a method of modifying data of an activated target-less point-in-time image of a storage volume, according to some embodiments.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, and/or computer instructions that are stored on a non-transitory tangible computer-readable medium and implemented by multi-purpose tangible processors, and any combinations thereof.

Figure 1:
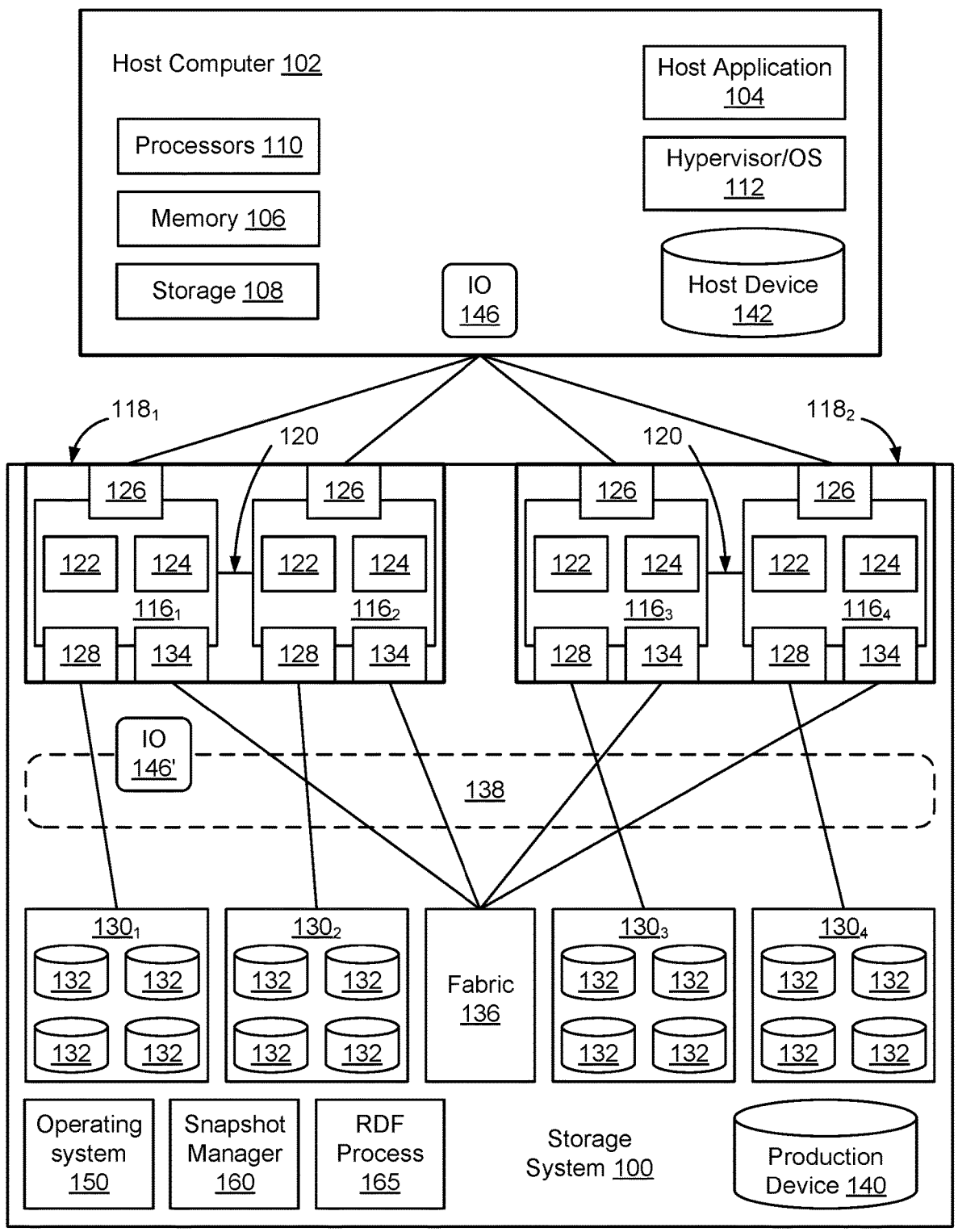
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. One example of a host application 104 is a storage system management application 150, which is discussed in greater detail below.

In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs (Central Processing Units), GPUs (Graphical Processing Units), and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM, and in some embodiments is used to implement a cache for processors 122. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$ using a PCIe (Peripheral Component Interconnect express) bus, or may be connected to the compute nodes $116_1$-$116_4$, for example, by an IB (InfiniBand) bus or IB fabric switch 136.

In some embodiments, each compute node 116 also includes one or more CAs (Channel Adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access) such that each compute node 116 may implement atomic operations on the local volatile memory 124 of itself and on the local volatile memory 124 of each other compute node 116 in the storage system 100.

The storage system 100 maintains data for the host applications 104 running on the host computer 102. For example, host application 104 may write host application data to the storage system 100 and read host application data from the storage system 100 in order to perform various functions. Examples of host applications 104 may include, but are not limited to, file servers, email servers, block servers, databases, and storage system management application 150.

Logical storage devices are created and presented to the host application 104 for storage of the host application data. For example, as shown in FIG. 1, in some embodiments a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by one or more of the compute nodes $116_1$-$116_4$ at non-contiguous addresses in shared global memory 138 and on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output) command 146 from the host application 104 to the host device 142, the hypervisor/OS 112 determines whether the IO 146 can be serviced by accessing the host computer memory 106. If that is not possible then the IO 146 is sent to one of the compute nodes $116_1$-$116_4$ to be serviced by the storage system 100.

In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory 138 from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. Writing data from shared global memory to managed drives 132 is referred to herein as "destaging" the data. The shared global memory 138 may enable the production device 140 to be reachable via all of the compute nodes $116_1$-$116_4$ and paths, although the storage system 100 can be configured to limit use of certain paths to certain production devices 140.

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. For example, to protect the production device 140 against loss of data, a snapshot (point in time) copy of the production device 140 may be created and maintained by the storage system 100. If the host computer 104 needs to obtain access to the snapshot copy, for example for data recovery, the snapshot copy may be linked to a logical storage volume (TDev) and presented to the host computer 104 as a host device 142. The host computer 102 can then execute read/write IOs on the TDev to access the data of the snapshot copy.

A "snapshot," as that term is used herein, is a copy of a volume of data as that volume existed at a particular point in time. A snapshot of a production device 140, accordingly, is a copy of the data stored on the production device 140 as the data existed at the point in time when the snapshot was created. To create a snapshot, IO operations on the storage volume are paused (quiesced) and the point-in-time copy of the storage volume is created.

When a snapshot of a production volume is created, the snapshot may include all of the data of the production volume, or only the changes to the production volume that have occurred since the previous snapshot was taken. Snapshots can be used, for example, for backups, decision support, data warehouse refreshes, recovery from logical corruption, or any other process that requires parallel access to production data.

Often, a given host computer 102 or host application 104 will access a set of storage volumes. To create a consistent point-in-time backup copy of the set of storage volumes, a set of snapshots (referred to herein as a "snapset") will be created at a particular point-in-time. To create a snapset, IO operations on each of the storage volumes is paused, and the point-in-time copies of each of the storage volumes is created. After creation of the snapshots of the snapset, IO operations on the storage volumes is resumed. Although some embodiments are described herein with reference to how the storage system implements creation of a single point-in-time targetless snapshot, it should be understood that these same techniques can be used to create multiple snapshots of a snapset.

Creation of a snapshot, in some embodiments, is a two-part process in which the operating system 150 on the storage system 100 is first instructed to "initiate" creation of a snapshot, and then instructed to "activate" the snapshot. During the "initiate" phase, the operating system is alerted that a snapshot is going to be created. This enables the OS 150 to prepare to create the snapshot. During the activate phase, the snapshot is actually created. During the activate phase, the OS 150 pauses IO operations on the storage volume, creates the point-in-time copy of the storage volume, and then resumes IO operations on the storage volume.

Once a snapshot has been activated, the data contained in the snapshot is immutable, meaning that the snapshot data cannot be changed by the host. Even after linking the snapshot data to a thin device, the point-in-time replica image does not change. Thus, once a point-in-time image has been created, the data image referenced by it does not change.

There are situations where it would be advantageous to activate a snapshot before all of the data of the snapshot has been added to the snapshot, and then allow the snapshot to be built after activation. Specifically, there are situations where it would be advantageous to enable the snapshot data to be modified by the storage system, to enable the storage system to create a crash-consistent replica of the source volume after the snapshot has been activated, while still ensuring that the data of the snapshot remains immutable from a user standpoint.

Modifying snapshot data after activation to create a crash-consistent replica of a source volume is useful in situations where it is difficult to include all required data in the snapshot before the snapshot is activated. One example where this may occur is in situations where the snapshot, or several snapshots of a snapset, need to be replicated on a remote data facility to a backup storage system.

Figure 2:
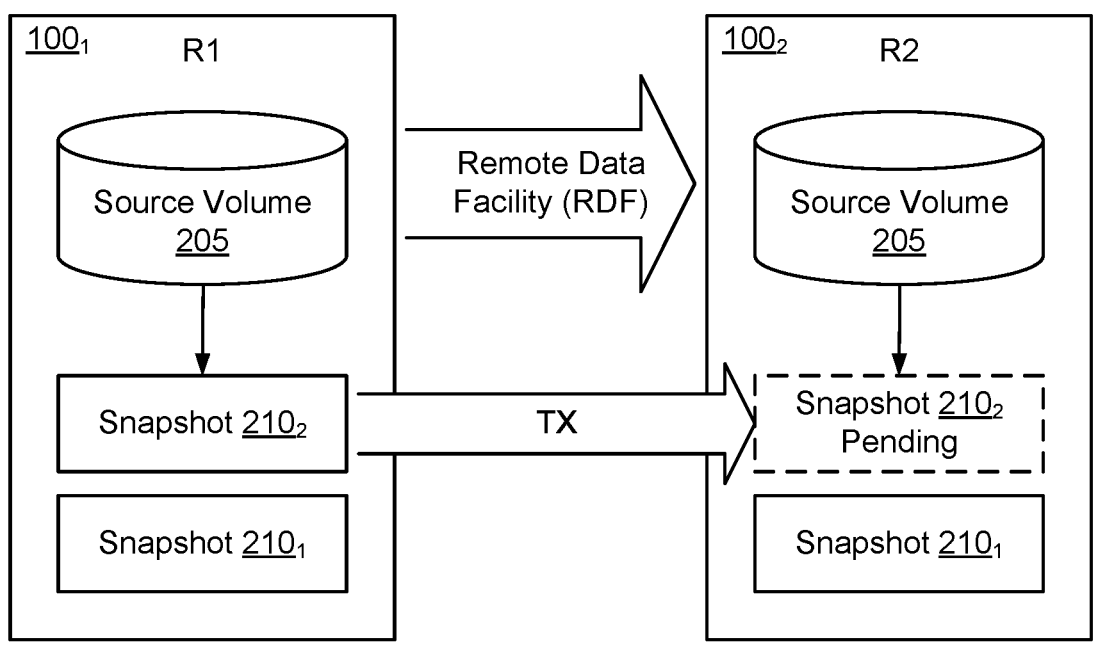
FIG. 2 is a functional block diagram of an example pair of storage systems configured to implement a remote data facility, according to some embodiments.

FIG. 2 is a functional block diagram of an example pair of storage systems configured to implement a remote data facility, according to some embodiments. In the example shown in FIG. 2, a primary storage system R1 and a backup storage system R2 are configured to implement a remote data facility (RDF) 200 on which data associated with source volume 205 and snapshots 210 of the source volume 205 are mirrored from the primary storage system R1 to the backup storage system R2.

It is possible for a primary storage system (R1) to perform data replication to a backup storage system (R2) where the storage systems 100 are compatible and properly configured. An RDF application 165, when executed on storage system 100, enables the storage system 100 to participate in storage system level data replication between sets of mirroring pairs of storage systems 100. A set of storage systems 100 (R1, R2) that are configured for data to be mirrored from a primary storage system R1 to a backup storage system R2 will be referred to herein as a "Remote Data Facility". A given storage system, such as storage system 100, may operate as a primary storage system R1 or backup storage system R2 in many mirroring pairs, and hence multiple RDF applications 165 may simultaneously execute on storage system 100 to control participation of the storage system 100 in the mirroring operations.

Data transfer among storage systems, including transfers between storage systems 100 for data replication (mirroring) functions, may take place in several ways depending on how the primary storage system R1 handles data written by the host 104 and how the backup storage system acknowledges receipt of data on the remote data facility. Two example data mirroring modes include synchronous data replication mode and asynchronous data replication mode, although other data mirroring modes may be implemented as well depending on the implementation.

When a snapshot is created on the first storage system R1, the snapshot will be transmitted on the remote data facility 200 to the backup storage system R2. Conventionally, when a snapshot was to be created, host IO operations on the source volume 205 would be paused, the snapshot would be initiated and activated on both the primary storage system R1 and the backup storage system R2 before IO operations on the source volume would be resumed. For example, as shown in FIG. 2, when snapshot 2102 is created on the primary storage system R1, the data for the snapshot will need to be transmitted on the remote data facility 200 to the backup storage system R2. Conventionally, the backup storage system would need to receive all of the data for the snapshot 2102 before the backup storage system would activate the snapshot. This means that host IO operations on the source volume are quiesced while the data associated snapshot is being mirrored on the remote data facility, even though the snapshot has been created on the primary storage system R1. This causes the background, remote data facility process, to interfere with IO operations on source volume 205, which is an undesirable result. This can be particularly acute in situations where there are multiple source volumes and multiple snapshots of a snapset that need to be transmitted to the backup storage system R2 on the remote data facility.

According to some embodiments, when a snapshot 210₂ is activated on the primary storage system R1, a corresponding snapshot 210₂ is also activated on the backup storage system R2, even though not all of the data associated with the corresponding snapshot 210₂ has been transmitted on the remote data facility. The activated snapshot on the backup storage system R2 is targetless, meaning that it is not mounted to a thin device (TDev). The status of the activated snapshot on the backup storage system R2 is set to "synchronization pending" or another similar designation to indicate that the snapshot on R2 does not contain all of the snapshot data, and to prevent the snapshot from being mounted to a TDev. As the data is received on the remote data facility, the data is added to the snapshot. Once the data is received, the status of the activated snapshot is changed to "ready" or some similar designation, and the snapshot may be mounted to a TDev. By enabling the snapshot 210 to be activated on the backup storage system R2 before all of the data of the snapshot 210 has been replicated to the backup storage system R2 on the remote data facility, it becomes possible to enable the host to resume IO operations on the source volume 205 much more quickly, particularly in situations where the snapshot 210 is one of a large number of snapshots in a snapset.

Although some embodiments will be described in which the snapshot that is to receive data is on a backup storage system, the same techniques can be applied to other snapshots. For example, if a snapshot of a snapshot is to be created on a given storage system 100, the second snapshot can be activated without having the tracks of data of the snapshot fully populated. The activated second snapshot can then be completed, and the status changed from synchronizing to ready at a subsequent point in time.

Figure 3:
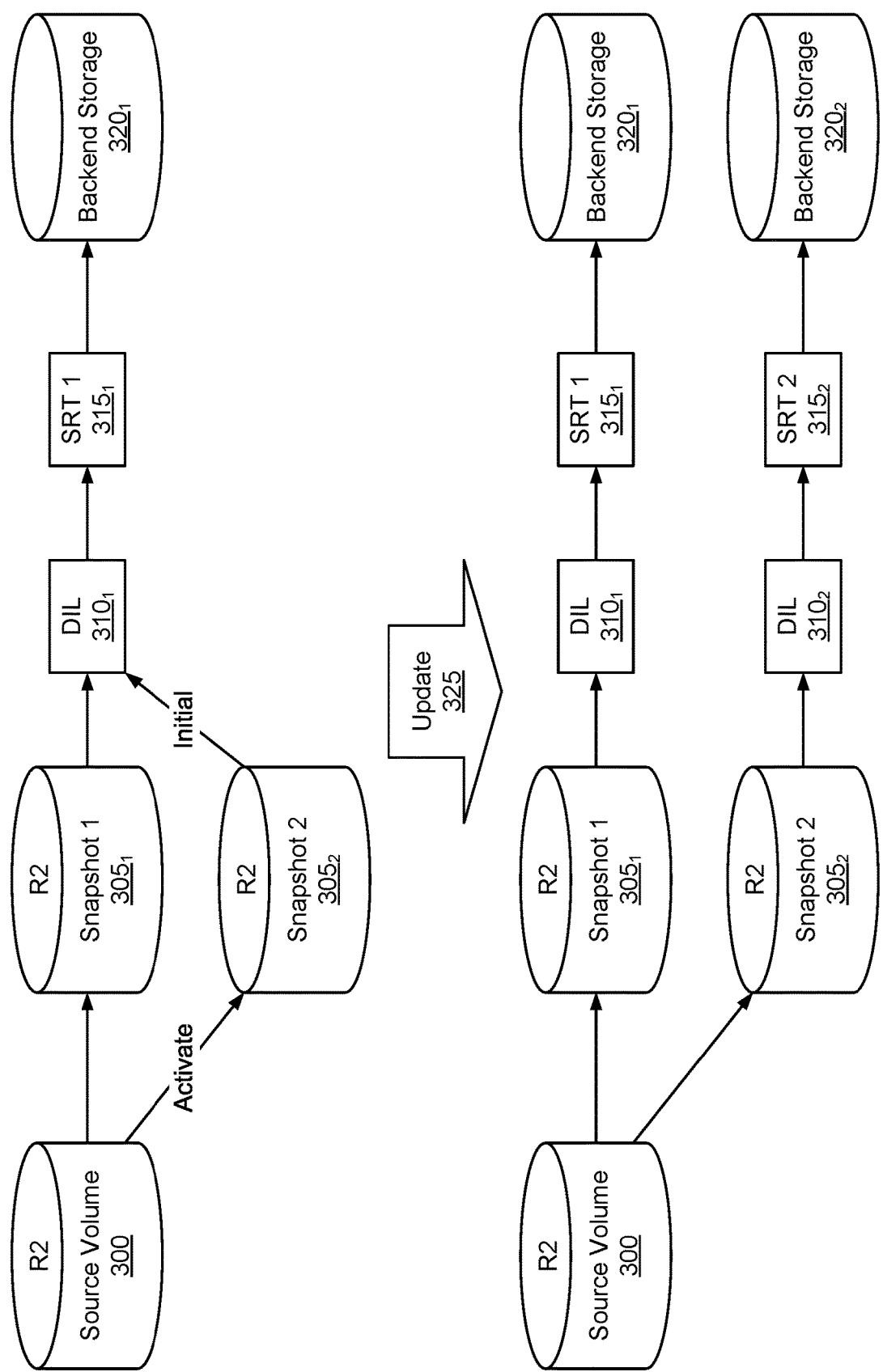
FIG. 3 is a functional block diagram graphically illustrating an example method of modifying data of an activated target-less point-in-time image of a storage volume, according to some embodiments.

FIG. 3 is a functional block diagram graphically illustrating an example method of modifying data of an activated target-less point-in-time image of a storage volume, according to some embodiments. As shown in FIG. 3, a source volume 300 forms the basis of a first snapshot 305₁ (snapshot 1). Entries 310₁ in Direct Image Lookup (DIL) data structure point to locations 315₁ in a Source Resource Table (SRT) which identify the locations of the tracks in backend storage 320₁. Other ways of locating the tracks of backend storage resources may be utilized as well, depending on the implementation.

When a second snapshot is activated, initially the tracks of the second snapshot references entries 310₁ in the DIL data structure. Over time, the snapshot image will be updated (arrow 325) by directly modifying the indirection table (DIL) entries 310₂ of the snapshot tracks to appropriately point to new entries 315₂ in the SRT. The new entries 315₂ in the SRT will point to new locations in backend storage resources or to new frontend tracks in the source volume 300.

Figure 4:
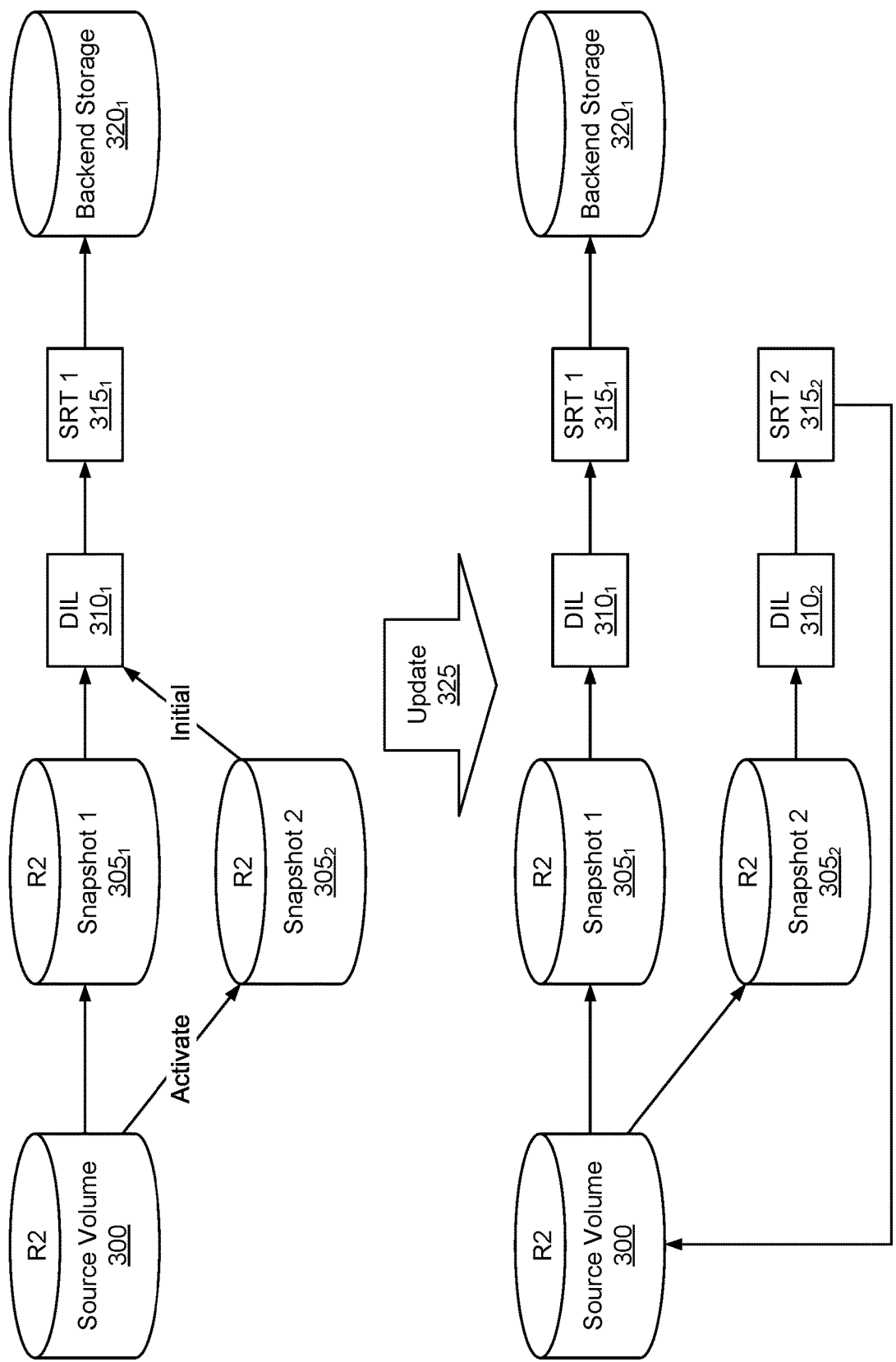
FIG. 4 is a functional block diagram graphically illustrating an example method of modifying data of an activated target-less point-in-time image of a storage volume, when one or more tracks of the point-in-time image point to the source volume, according to some embodiments.

FIG. 3 illustrates the situation where the update 325 causes one or more entries 310₂ in DIL of the second snapshot to point to entries 315₂ in the SRT which reference tracks of backend storage resources 320₂. FIG. 4 is similar to FIG. 3, and illustrates the situation where the update 325 causes one or more entries 310₂ in DIL of the second snapshot to point to entries 315₂ in the SRT which reference tracks in source volume 300. In either instance, the update is implemented by modifying the DIL entries 310₁ to reference new entries 315₂ in SRT to thereby reference new storage locations containing the snapshot 2 data. In some instances, the DIL of the second snapshot will have some entries that point to backend storage resources and other entries that point to the source volume 300.

It should be noted, that although the storage system 100 is able to modify the data contained in the snapshot 2 after it is activated, from a user standpoint the data contained in the snapshot is immutable. Stated differently, although the storage system can continue to build the snapshot after the snapshot has been activated, the user cannot modify the data of the snapshot after the snapshot has been activated. If the user tries to mount the snapshot 2 to access the data during the period after the snapshot has been activated and before the update 325 process has completed, the storage system will provide the user with notice that the snapshot is currently being synchronized, and that the snapshot will be mounted to a TDev once the synchronization process has completed.

FIG. 5 is a flow chart of a method of modifying data of an activated target-less point-in-time image of a storage volume, according to some embodiments. The method in FIG. 5 describes creation of a snapshot in the context of a remote data facility, although the same process can be used to create snapshots in other contexts as well.

As shown in FIG. 5, on the primary storage system R1, when a snapshot is to be created, an "initiate" snapshot message is sent to the storage system 100 operating system 150 to alert the operating system that a snapshot command is anticipated (block 500). Optionally, in some embodiments, an "initiate" notification is passed on the remote data facility to the backup storage system R2 to notify the backup storage system R2 that a snapshot command is anticipated (block 505).

The storage system 100 will open a quiescence window to pause IO operations on the source device (510). Where there are multiple source devices that are part of a consistency group, opening the quiescence window will cause IO operations on the set of devices that form the consistency group to all be paused, so that a crash consistent snapset can be created across all devices of the consistency group. The storage system will then activate the snapshot and record the set of IOs of the source device (either a full copy of the source device or the changes to the source device since the last snapshot) (block 520). Optionally, in some embodiments, an "activate" notification may be passed on the remote data facility to the backup storage system R2 (block 525).

Once IO operations have been paused on the source device, a snapshot of the source device is created (block 520). The snapshot may be a full snapshot of the source device or may contain only the changes to the source device since creation of the last snapshot. Once the snapshot has been created on the primary storage system, the quiescence window is closed to enable IO operations on the source device to resume (block 545). Transmission of the data on the remote data facility will begin once the snapshot has been created on the primary storage system (block 520). As shown in FIG. 5, transmission of the new snapshot data on the remote data facility can be initiated before the quiescence window is closed or after the quiescence window has been closed, depending on the implementation.

On the backup storage system R2, when the backup storage system R2 receives an "activate" notification (block 525), or when the backup storage system the backup storage system starts to receive snapshot data on the remote data facility (block 540), the backup storage system will activate a snapshot and mark the snapshot status as pending synchronization (block 525). As the backup storage system R2 receives data on the remote data facility (block 540) the backup storage system will use the data to update the DIL entries 310 to point to either new backend tracks or source tracks to build the snapshot over time (block 550).

Once the quiescence window has been closed, the host can resume IO operations on the source device (block 545). In addition, as shown in FIG. 5, after the quiescence window has been closed, the primary storage system R1 will continue transmission of the snapshot data on the remote data facility until transmission of the snapshot data has been completed (block 555). When the backup storage system R2 completes reception of the snapshot data on the remote data facility (block 560) the backup storage system R2 will update the status of the snapshot on the backup storage system R2 to enable the snapshot to be mounted and used on the backup storage system R2 (block 565).

By enabling transmission of the snapshot data to continue after the quiescence window for creation of the snapshot on the primary storage system has been closed, it is possible to reduce the amount of time IO operations on the source volume are quiesced. Thus, the background process of transmitting the snapshot data is allowed to occur after activation of the snapshot on the backup storage system R2 while still creating a crash consistent point in time set of storage volumes on the backup storage system. This enables partially formed point-in-time replicas of storage volumes to be created and corrected after they are created, while keeping the point-in-time replicas immutable from an user standpoint.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for modifying data of an activated target-less point-in-time image of a storage volume, the computer program including a set of instructions which, when executed by a computer, cause the computer to perform a method comprising the steps of:
   opening a quiescence window on a storage volume to pause IO operations on the storage volume;
   after opening the quiescence window, creating a first snapshot of the storage volume;
   after creating the first snapshot, closing the quiescence window on the storage volume to enable IO operations on the storage volume to resume;
   activating a second snapshot of the storage volume;
   copying data from the first snapshot to the activated second snapshot of the storage volume after the second snapshot has been activated; and
   marking a status of the activated second snapshot to prevent the activated second snapshot from being linked to a thin device until after completion of copying of the data from the first snapshot to the activated second snapshot.

2. The non-transitory tangible computer readable storage medium of claim 1, wherein the first snapshot is on a primary storage system, the second snapshot is on a backup storage system, and the step of copying data from the first snapshot to the activated second snapshot occurs on a remote data facility.

3. The non-transitory tangible computer readable storage medium of claim 1, wherein the step of copying data from the first snapshot to the second snapshot is initiated prior to the step of closing the quiescence window, and continues after the step of closing the quiescence window.

4. The non-transitory tangible computer readable storage medium of claim 1, further comprising completing receipt of data from the first snapshot by the activated snapshot, and changing the status of the activated second snapshot to allow the activated second snapshot to be linked to the thin device.

5. The non-transitory tangible computer readable storage medium of claim 4, wherein data of the activated second snapshot of the storage volume is immutable to an user while data is being copied from the first snapshot to the activated second snapshot and after completing receipt of data from the first snapshot by the activated second snapshot.

6. The non-transitory tangible computer readable storage medium of claim 1, wherein the step of copying data from the first snapshot to the second snapshot is initiated after the step of closing the quiescence window, and continues after the step of closing the quiescence window.

7. The non-transitory tangible computer readable storage medium of claim 1, wherein the step of creating the first snapshot of the storage volume comprises creating a first snapshot Direct Image Lookup (DIL) data structure pointing to tracks of storage resources containing data of the storage volume.

8. The non-transitory tangible computer readable storage medium of claim 7, wherein the step of activating the second snapshot of the storage volume comprises creating a second snapshot DIL data structure, and wherein the step of copying data from the first snapshot to the activated second snapshot comprises updating the second snapshot DIL data structure to point to second tracks of storage resources containing the data of the storage volume.

9. The non-transitory tangible computer readable storage medium of claim 1, wherein data of the activated second snapshot of the storage volume is immutable to an user while data is being copied from the first snapshot to the activated second snapshot.

10. A non-transitory tangible computer readable storage medium having stored thereon a computer program for modifying data of an activated target-less point-in-time image of a storage volume, the computer program including a set of instructions which, when executed by a computer, cause the computer to perform a method comprising the steps of:
opening a quiescence window on a storage volume to pause IO operations on the storage volume;
after opening the quiescence window, creating a first snapshot of the storage volume;
after creating the first snapshot, closing the quiescence window on the storage volume to enable IO operations on the storage volume to resume;
activating a second snapshot of the storage volume; and
copying data from the first snapshot to the activated second snapshot of the storage volume after the second snapshot has been activated;
wherein the step of copying data from the first snapshot to the second snapshot is initiated prior to the step of closing the quiescence window, and continues after the step of closing the quiescence window.

11. A method of modifying data of an activated target-less point-in-time image of a storage volume, comprising the steps of:
opening a quiescence window on a storage volume to pause IO operations on the storage volume;
creating a first snapshot of the storage volume;
closing the quiescence window on the storage volume to enable IO operations on the storage volume to resume;
activating a second snapshot of the storage volume;
copying data from the first snapshot to the activated second snapshot of the storage volume after the second snapshot has been activated; and
marking a status of the activated second snapshot to prevent the activated second snapshot from being linked to a thin device until after completion of copying of the data from the first snapshot to the activated second snapshot.

12. The method of claim 11, wherein the first snapshot is on a primary storage system, the second snapshot is on a backup storage system, and the step of copying data from the first snapshot to the activated second snapshot occurs on a remote data facility.

13. The method of claim 11, wherein the step of copying data from the first snapshot to the second snapshot is initiated prior to the step of closing the quiescence window, and continues after the step of closing the quiescence window.

14. The method of claim 11, further comprising completing receipt of data from the first snapshot by the activated snapshot, and changing the status of the activated second snapshot to allow the activated second snapshot to be linked to the thin device.

15. The method of claim 14, wherein data of the activated second snapshot of the storage volume is immutable to an user while data is being copied from the first snapshot to the activated second snapshot and after completing receipt of data from the first snapshot by the activated second snapshot.

16. The method of claim 11, wherein the step of copying data from the first snapshot to the second snapshot is initiated after the step of closing the quiescence window, and continues after the step of closing the quiescence window.

17. The method of claim 11, wherein the step of creating the first snapshot of the storage volume comprises creating a first snapshot Direct Image Lookup (DIL) data structure pointing to tracks of storage resources containing data of the storage volume.

18. The method of claim 17, wherein the step of activating the second snapshot of the storage volume comprises creating a second snapshot DIL data structure, and wherein the step of copying data from the first snapshot to the activated second snapshot comprises updating the second snapshot DIL data structure to point to second tracks of storage resources containing the data referenced by the first snapshot DIL data structure.

19. The method of claim 11, wherein data of the activated second snapshot of the storage volume is immutable to an user while data is being copied from the first snapshot to the activated second snapshot.

20. A method of modifying data of an activated target-less point-in-time image of a storage volume, comprising the steps of:
opening a quiescence window on a storage volume to pause IO operations on the storage volume;
creating a first snapshot of the storage volume;
closing the quiescence window on the storage volume to enable IO operations on the storage volume to resume;
activating a second snapshot of the storage volume; and
copying data from the first snapshot to the activated second snapshot of the storage volume after the second snapshot has been activated;
wherein the step of copying data from the first snapshot to the second snapshot is initiated prior to the step of closing the quiescence window, and continues after the step of closing the quiescence window.

\* \* \* \* \*